J. SAVOIE.
TIRE PROTECTOR.
APPLICATION FILED OCT. 26, 1911.

1,024,458.

Patented Apr. 23, 1912.
2 SHEETS—SHEET 1.

Witnesses
Ada E. Hagerty
Elsa B. Dana

Inventor
Joseph Savoie
By Joseph H. Miller
Attorney

J. SAVOIE.
TIRE PROTECTOR.
APPLICATION FILED OCT. 26, 1911.
1,024,458.
Patented Apr. 23, 1912.
2 SHEETS—SHEET 2.
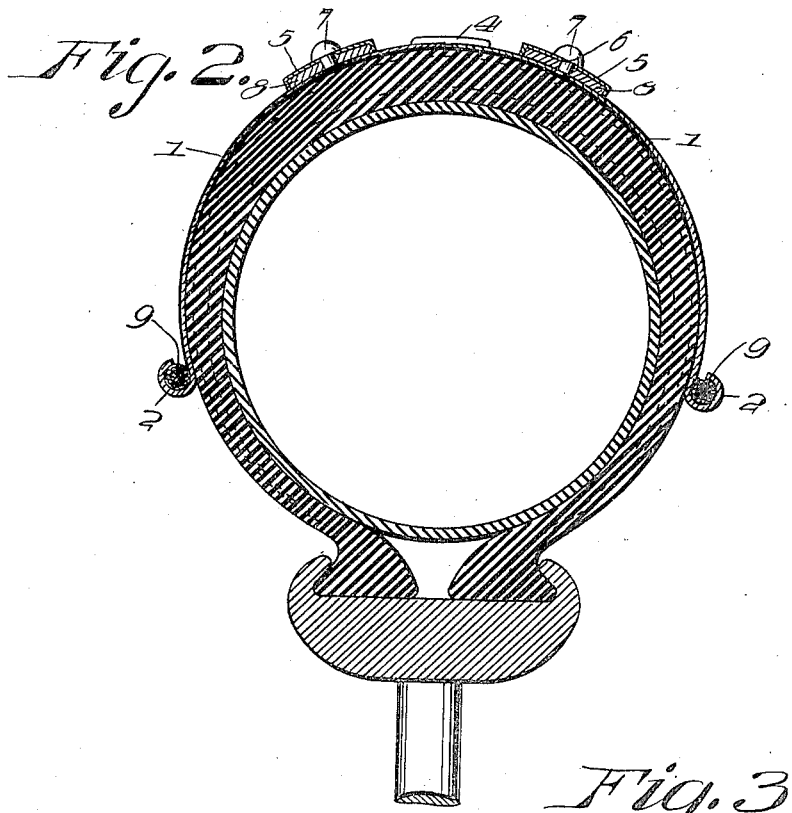
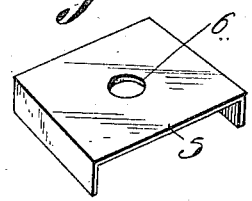
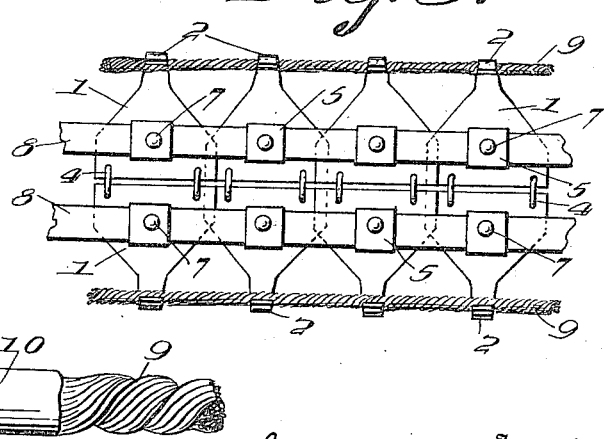
Witnesses
Ada E. Hagerty
Elva B. Dana
Inventor
Joseph Savoie
By Joseph H. Miller
Attorney

UNITED STATES PATENT OFFICE.

JOSEPH SAVOIE, OF CENTRAL FALLS, RHODE ISLAND.

TIRE-PROTECTOR.

1,024,458.  Specification of Letters Patent.  Patented Apr. 23, 1912.

Application filed October 26, 1911. Serial No. 656,821.

*To all whom it may concern:*

Be it known that I, JOSEPH SAVOIE, a citizen of the United States, residing at Central Falls, in the county of Providence and State of Rhode Island, have invented a new and useful Improvement in Tire-Protectors, of which the following is a specification.

This invention pertains to certain new and useful improvements in tire protectors, and the objects of the invention are to provide an improved, simplified and novel form of tire protector which possesses maximum efficiency in protecting the tire, and which is capable of being easily and readily applied to and removed from the tire.

Further and other objects will later appear.

Figure 1:
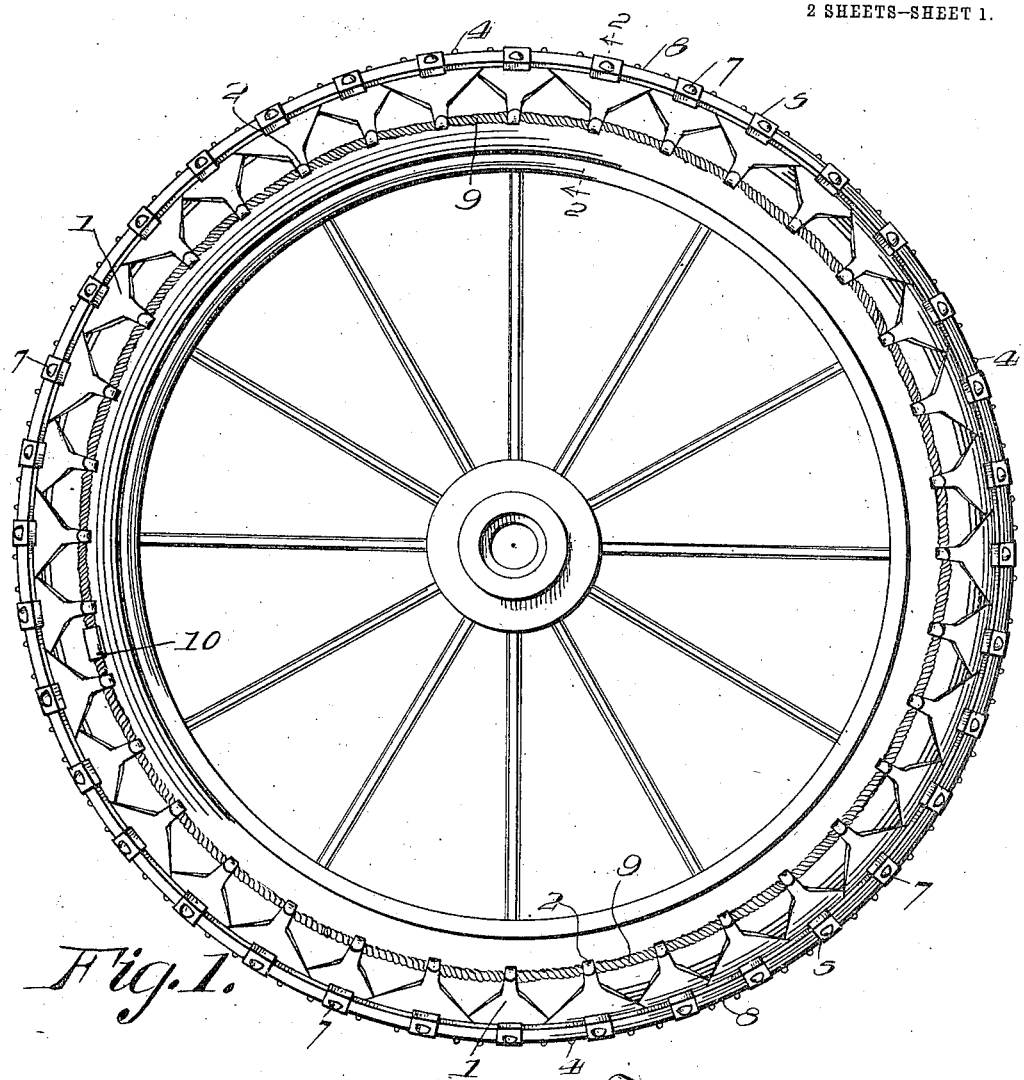
Figure 4:
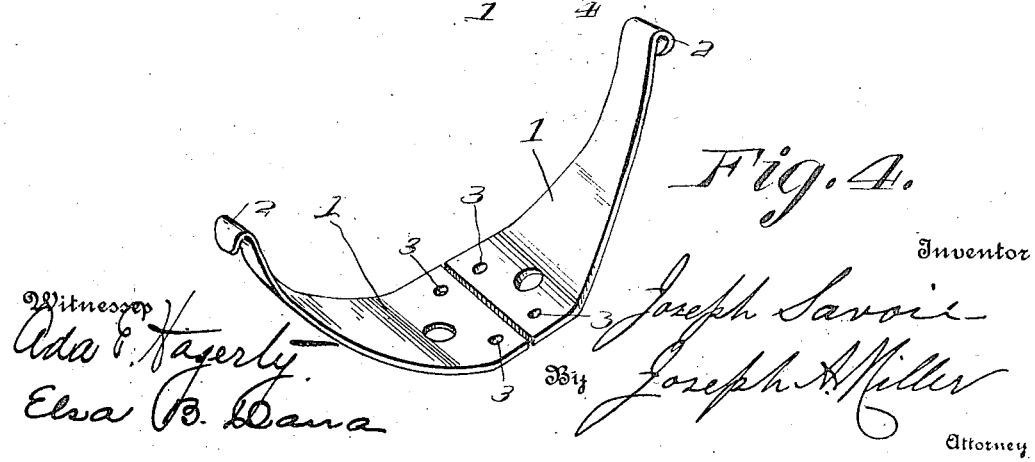

In the drawings,—Figure 1 is a side elevation of a wheel equipped with the present invention. Fig. 2 is a section taken on the line 2—2 of Fig. 1. Fig. 3 is a fragmentary top plan view of the protector or armor detached from the wheel. Fig. 4 is a perspective view of a pair of the armor sections. Fig. 5 is a similar view of one of the washers, and Fig. 6 is a side elevation of the holding member, showing the manner in which the ends of the same are connected.

The protector or armor consists of a series of sections 1 formed of sheet metal and curved to fit over the tire periphery, as shown. The outer ends of the sections taper as depicted in the drawings, and at their extremities are formed with hook-shaped portions 2. The inner ends of the sections 1 are formed with pairs of openings 3 which are for the purpose of receiving the connection links 4 that are passed through the same. The inner ends of the sections are located opposite to each other in spaced relation and the links 4 serve to connect said sections in an obvious manner.

As illustrated in Fig. 5 of the drawings, metal washers 5 of approximately U-shape are formed with openings 6 to receive rivets 7 that pass through the same and through the sections 1, the washers being placed over leather straps 8 that are disposed to extend around the periphery of the tire in spaced relation to each other. As clearly indicated in Fig. 2 of the drawings one of the straps 8 serves to connect the series of sections on one side of the tire, and the other strap performs a like function for the series of sections 1 on the opposite side of the tire. The heads of the rivets project beyond the periphery of the protector and act as anti-skidding means. As will be more particularly seen in Fig. 3 of the drawings, the sections 1 overlap one another so as to provide an effective covering for the tire tread which will prevent the same from coming in contact with objects tending to injure same in any way. The metal washers 5 also act as anti-skidding elements and also serve to protect the leather straps 8.

A wire rope or element 9 of circular form passes entirely about the tire being received in the hook-shaped portions 2 of the protector sections 1, the wire being drawn taut so as to firmly hold the protector sections against the tread of the tire. The ends of the wire ropes are secured to each other by twisting, one end being disposed in overlapping relation to the other end, after which the parts are soldered, as indicated at 10 in Fig. 6 of the drawings.

From the above it will be seen that there is a series of sections on each side of the tire, the sections having their inner ends connected at points in alinement with the extreme or highest point of the periphery of the tire, the sections of each series being connected by means of leather straps which are flexible, and which also serve as anti-skidding elements, in addition to acting as a further protective covering for the tire.

Having thus described my invention, I claim as new and desire to secure by Letters Patent;—

1. In a protective armor for tires, a series of overlapping sections on each side of the tire, each section having a hook-shaped outer end, links connecting the inner ends of the sections, a leather strap engaging about the sections of each series, said straps being arranged in relative spaced relation, U-shaped washers seating on the straps, rivets passed through the washers, straps and the sections, and a wire rope on each side of the tire engaging through the hook-shaped ends of the sections to hold the latter in position.

2. In tire armor, two opposed series of sections having their inner ends connected to one another, a leather strip for each series connected to each section thereof, and washers having portions which seat on their outer faces of the strips, and further having sides that extend along the sides of said strips.

3. In tire armor, two series of sections having their inner ends connected to one another, a leather strip for each series disposed on the outer faces of the sections of each series, washers on the outer face of each strip, and means passed through the washers, strips and sections to secure said parts together.

4. In tire armor, two opposed series of sections having their inner ends connected to one another, a flexible strip for each series of sections disposed on the outer faces of the sections of each series, and means to connect the sections to the strips.

5. In tire armor, two opposed series of sections having their inner ends connected to one another, a flexible strip for each series of sections disposed on the outer faces of the sections of each series, said flexible strips being disposed on opposite sides of the points of connection between the opposed series and having connection with their respective series.

In testimony whereof I have signed my name to this specification in the presence of two subscribing witnesses.

JOSEPH SAVOIE.

Witnesses:
 ADA E. HAGERTY,
 J. A. MILLER.